United States Patent
Frederick (10) Patent No.: US 6,296,068 B1
(45) Date of Patent: Oct. 2, 2001

(54) PLANTING SYSTEM

(76) Inventor: W. Richard Frederick, 744 Bonniebrook, Mundelein, IL (US) 60060

( * ) Notice: Subject to any disclaimer, the term of this patent is extended or adjusted under 35 U.S.C. 154(b) by 0 days.

(21) Appl. No.: 09/336,070

(22) Filed: Jun. 18, 1999

Related U.S. Application Data (60) Provisional application No. 60/089,909, filed on Jun. 19, 1998.

(51) Int. Cl.$^7$ ............................. E21B 10/26; A01C 5/02
(52) U.S. Cl. ...................... 175/323; 111/116; 175/388; 175/394
(58) Field of Search ........................... 111/116, 106, 111/100; 172/41, 110, 111; 37/403; 175/323, 394, 385, 386, 388

(56) References Cited

U.S. PATENT DOCUMENTS

| | | | |
|---|---|---|---|
| 152,522 | * 6/1874 | Sandlin | 175/292 |
| 183,467 | * 10/1876 | Pierce | 175/318 |
| 187,705 | * 2/1877 | Collins | 175/391 |
| 204,025 | * 5/1878 | Glass | 175/242 |
| 706,396 | * 8/1902 | Enrenfeld | 175/241 |
| 2,352,326 | * 6/1944 | Kandle | 175/242 |
| 2,385,441 | * 9/1945 | Hill | 172/25 |
| 4,807,710 | 2/1989 | Greeley | 175/394 |
| 5,133,269 | 7/1992 | Charneski | 111/116 |
| 5,564,353 | 10/1996 | Wade et al. | 111/116 |

* cited by examiner

*Primary Examiner*—Thomas B. Will
*Assistant Examiner*—Meredith C. Petravick
(74) *Attorney, Agent, or Firm*—Jenkens & Gilchrist (57) ABSTRACT

A planting system with the special planter to dig uniform holes, puck type plant feeders to go in the holes and plastic dual planting trays. These can be used independently or in any combination. Features include a protective shroud, pulverizing the dirt by circulating it in an enclosed area, a tapered spiral ramp to help pile the dirt and pulverize it, a root cutter, ground clearing with spinning shroud, a friction plate to power ground clearing, pointed feet at the bottom of the shroud to stop the spinning when excavation starts, a rock sifter including a ramped face on the internal louvers, a rock catcher ring with flexible fingers, piling the dirt around the perimeter, hole depth measurement rings on the shaft, a slidable ring to select gap between the bottom of the shroud and the ground and an optional locking stop ring to guarantee uniform hole depth.

4 Claims, 6 Drawing Sheets

PLANTING SYSTEM

CROSS-REFERENCE TO RELATED APPLICATION

This application claims priority from Provisional Application No. 60/089,909, filed Jun. 19, 1998, and entitled "Planting System Including Auger, Ground Clearing, Dirt Piling and Depth Control."

FIELD OF INVENTION

This invention relates to a planting device that optimizes pre-started "annuals" planting. It also opens the possibility for specialized "fertilizing disc" and other "consumable" products that additionally enhance its effectiveness and increase sales.

BACKGROUND OF THE INVENTION

It has been known to use an auger or other cookie-cutter type tools to plant perennial flower bulbs, usually at between 4–6" deep. Cookie-cutter type tools are limited in what they do not pulverize the dirt, have no means to control multiple hole depths, require a lot of manual labor and are tough to use if there is a lot of debris on or in the soil.

Simple augurs are limited in what they do and are not designed for efficient use at the size and depth of pre-started annual flowers, which are the most common type of planting. Also, if a typical homeowner's variable speed drill is used to power an auger and is run slowly, it tends to bog down or grab. If it is run fast, the dirt flies all over the place and thus is not available to fill around the new plants. Also this flying debris can be a hazard to the gardener or others that may be nearby. If mulch or other types of ground cover are present, they contaminate the back-fill since the dirt coming out of the hole goes on top of this surrounding material. In addition there is no way to accurately and easily measure planting depth or provide for multiple planting depths. In some cases a rectangular tab has been welded on the shaft but this only gives a single depth, usually at 6" which is too deep for most perennials. This tab cannot be adjusted or go into the hole, and since it is spinning it can be dangerous.

SUMMARY OF THE INVENTION

The present invention is a multipurpose tool tailored to annual flower planting, but it also improves perennial bulb planting. The auger can also be used in other applications such as loosening soil, digging small holes, cleaning out drain pipes, etc. It has solved all of the above drawbacks and problems with an inexpensive, reliable three-piece assembly. This technology also provides several additional useful features, previously unavailable. These dramatically shorten the time needed for planting while doing the job better. In a time study which included removing mulch from around the hole, it only took on average ten seconds for each plant. This is less than ⅕ the time compared to doing it by hand using a small hand garden spade. The tool pieces are: (1) a special hole drilling auger with tapered dirt unloading ramp, root cutter and depth measurement rings marked on its shaft, (2) a shroud which improves safety by preventing accidental contact with the auger and also provides mulch removal, rock and debris sifting and a catch for it, dirt unloading and perimeter dirt piling, and (3) a simple elastomeric slip ring for the shroud height adjustment which regulates ground cover removal. This also provides a friction plate between the shroud and this ring. This friction provides safe spinning forces to thoroughly remove ground cover and mulch.

The key features allow the normal multiple planting steps to be accomplished better, more safely, automatically and in a single powered operation. Resulting advantages are (1) uniform, quality holes are produced through the combination of tool elements; (2) stand-up operation is permitted using a power drill; (3) point positioning and tool centering make it easy to start the holes even in mulch-covered ground; (4) root cutting minimizes grabbing and vibration and improves the hole quality; (5) the protective shroud reduces the residual flying debris hazard and prevents accidental contact with the auger; (6) mulch or ground debris are removed automatically before digging starts; (7) the dirt is pulverized as it is being excavated; (8) the pulverized dirt is automatically piled around the debris-cleared perimeter of the hole; (9) large rocks or debris are sifted by a catch ring that is easy to empty; (10) an accurate and easily readable depth scale permits measuring the real hole depth while standing up.

An optional stop ring can be slipped over the auger shaft. It is easy to get the hole depth right every time when this mechanical stop is locked in place.

DETAILED DESCRIPTION OF THE DRAWINGS

DETAILED DESCRIPTION OF PREFERRED EMBODIMENTS

Quality Holes & Powered Stand-Up Operation: This tool is a labor-saving device. It is designed to plant flowers better, easier and in a fraction of the time required by other techniques. It is intended to automatically do all of the hole preparation and cultivation steps by itself. Working the soil prior to using the tool can actually reduce its efficiency. This is because the dirt may then be too soft to hold the hole's shape, plus surface debris has typically been worked in by this operation. This planter can also be part of a three-element planting system which will be explained later. Its design is tailored for planting pre-started annuals as they come out of their plastic starter pots, but it provides improved performance for perennials also. The tool can be used while standing up and with a common size, readily available, ⅜", variable speed, electric power drill. It can be used with a battery-powered drill but the number of holes is limited. A battery-powered drill will only do a few dozen holes before a recharged battery is needed. In addition, if one wishes to start a new flowerbed where the ground is hard, this powered tool makes it much easier and faster while still providing soft, pulverized dirt next to the plant roots to enhance plant growth. When a flowerbed is "worked" conventionally, all of the ground, or at least the ground for a foot or so around the plant, is loosened. But typical annual plants do not send their roots out a foot or so, and if they do, by the time they get this far out the ground has settled and is hard again. This planter provides "better" dirt in the immediate area where the roots will take hold. The elements that work together are a root cutter which does this function and thus allows the auger blade to produce the right size, quality hole. A taper on the auger's spiral ramp helps to pulverize the dirt and get all the loose dirt out of the hole. It also helps to push the dirt out the shroud slots so that the dirt is piled nicely around the hole. Depth measurement rings give a depth reference, providing the correct planting depth and uniformity.

Having uniform, clean holes makes it easy to introduce additional new products. The first is a "plant starter" which is placed in the bottom of the hole prior to placing the plant and refilling. Also an additional "dual plastic pot" system can be used with this "planter" and the "starters". The outer pot will have a recess at the bottom to receive the plant starter. Puck or disc-type "starters" are preferred, but conventional granular or pill type products will also work. The disc or puck starters are about 1½" in diameter and ½" thick. If a "pilot hole" feature is incorporated into the auger, it will be sized to fit this starter disc. The starter disc is simply and quickly dropped into the bottom of the hole before the plant is placed and the dirt is refilled. The time release nourishment will go in right at the roots. Conventional starters are typically time-release 20-10-5 fertilizer balls or 5-10-5 granules that need to be mixed in with loose soil at the bottoms of the holes. This requires considerable work, gives a spot release that must be slow to avoid burning the plant, and does not progressively improve the composition of the soil. The starter discs are formulated to absorb moisture and to soften so that the roots will quickly and easily penetrate this quick-start material. The discs are basically a compressed ball of potting soil or peat moss, compost and perhaps sand, with evenly saturated time release fertilizer and a water soluble cellulose or starch type surface binder. The binder holds its shape until it is placed. This provides accelerated growth to improve the duration and look of the flowerbeds and also progressively improves the soil.

Positioning and Centering: Starting and centering with conventional augers can be difficult. Many do not have a centering tip so that if there is a considerable amount of mulch or ground cover, the auger wanders on top of this material. Some previous augers have had tips, but these usually add a small triangular tab welded at the end of this tip. This tab reams out the center of the hole, and when the single cutting side of the spiral auger starts digging, the tool shakes because of this oversize center and the offset, unbalanced forces. Some have made this tip a couple inches long to overcome this problem, but the extra length makes dual planting depths impractical.

Root Cutting: Root cutting is especially beneficial since roots cause standard augers to frequently catch, which is a nuisance. Automatic root cutting avoids the frustration of having the auger grab. The root cutter is designed with dual, symmetrical blades which minimize tool vibration. Automatically cutting the roots allows the auger to easily bore uniform holes and minimizes the number of times the hole sides collapse.

Protective Shroud and Debris Removal: The planter includes a protective shroud around the auger that also automatically removes debris from around the hole before excavation begins. This assures that the pulverized, piled fill around the plant is primarily pulverized dirt with a minimum amount of contaminants. With previous technologies, especially augers and hand spades, junk or the mulch that is used and recommended to improve the bed, gets mixed in with the soil as it is being excavated. Or it frequently just falls back into the hole. If one uses mulch to improve the planting area by holding moisture, reducing weeds, etc., then it is easy to get it mixed in with the soil, which degrades the planting area. The present invention also helps to remove prickly material, such as pine needles, so that they are not an irritant to the gardener during the planting and refilling of the holes.

Excavating, Pulverizing and Piling Dirt: The dirt-pulverizing feature pulverizes the dirt, and the dirt unloading and piling feature places the dirt around the debris-cleared perimeter of the hole. The dirt can then be easily and quickly refilled around the plant with little or no surface debris mixed in with it. Pulverizing the dirt improves water absorption, helps to eliminate air pocket voids in the dirt and provides soft dirt where the roots will take hold. Having pulverized dirt also makes it easier for the gardener to refill the hole around the new plant since the smaller particles sift in more easily. Piling the dirt near to and around the perimeter of the hole, in a controlled way, makes it easy to simply refill the hole and then replace or return the mulch.

Rock Sifting and Catching: A rock and debris sifter and an associated catch ring remove buried, larger, unwanted material from the pulverized dirt and catches and holds it automatically in the shroud. It can then be easily dumped from the shroud into a bucket for easy removal from the planting area. This is accomplished by simply sliding the shroud up the auger shaft until it is above the top of the spiral. Shaking the tool at an angle causes the rocks to fall out of the catch.

Hole Depth Measurement: Accurate depth control with good hole formation, applied to perennials, allows easy, consistent, one-step bulb planting at the optimum depth. The accurate-depth planting also allows perennials, such as tulips, to be planted at their normal deeper depth, and then annuals can be planted adjacent to or over them. This dual use of the flowerbed offers a longer flowering season without the work of removing all the bulbs. With depth accuracy, the deeper bulbs are not accidentally damaged or disturbed if they are left in the ground, when shallow annuals are planted above or near them. Attention must be given to the types of plants selected, of course, since some perennials need to be planted at less than 3". There is however a huge assortment that can go in at 4" or more.

Since most annuals are started in uniform size plastic trays that are about 2" deep, accurate depth also allows the hole to be just deep enough so that when the plant is placed, it is level with the top of the ground. No bottom filling or additional excavating is needed. This allows the gardener to get the plant depth right the first time, in less time and with a power tool. This should encourage gardeners to plant more flowers and use more weed- and/or feed-type products. Easy and accurate hole formation, as already discussed, also facilitates and enhances the possibility of using the "dual/ported plastic pot" as part of a planting system.

Figure 1:
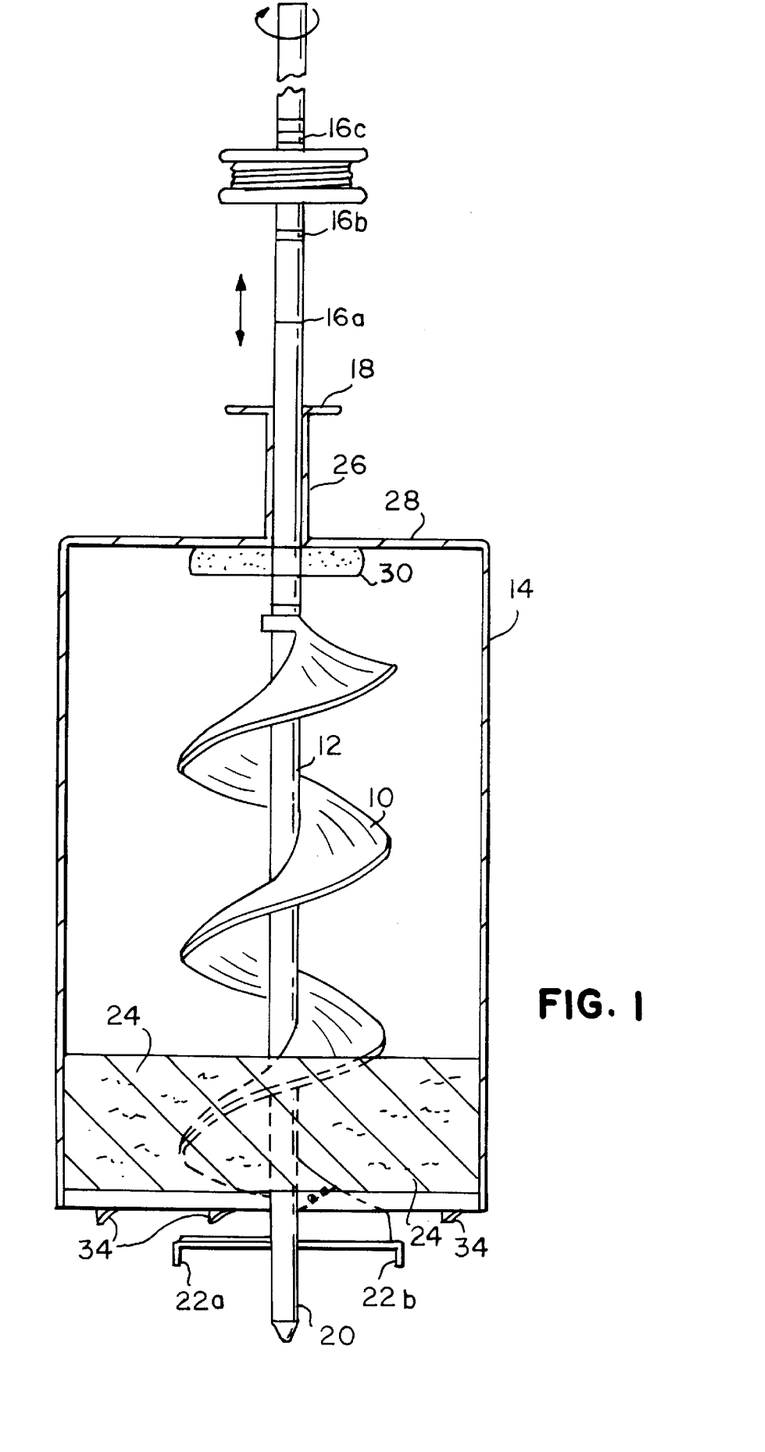
FIG. 1 is a side elevation of a planting tool embodying the present invention, with the shroud member shown in section.

To elaborate on the elements in this system, the prestarted plants are started at the nursery in these special flats that include dual/ported pot sections. They are then shipped to the retail outlets still in these special flats. The flats are separated into individual dual pots by the gardener, and both are placed in the accurately sized holes produced by the auger. Some filling may be needed, or a special version can be designed to conform exactly. The plastic is not removed from the plant. The gardener rotates the inner pot 90° to align openings or ports in both the inner and outer pots. In this position the roots can grow into the soil through the two now-exposed openings. The next year when new annuals are planted, the old inner pot is rotated inside the outer one. This severs any remaining roots, and the inner pot is lifted out. A puck starter is dropped in the recess, the new plant still in its plastic pot is aligned so the holes line up, and it is then placed in the still-buried outer pot. This process is repeated year after year. The plastic material will need to be slightly thicker than conventional materials now used for flats, but the manufacturing methods and processes are the same. The design shape and punching are all that change. This system makes it even easier and quicker to plant flowers Uniform hole formation has been explained before and is the result of the individual tool features working together. The following descriptions of specific tool elements should provide an in-depth understanding of how each element contributes to the overall performance. Referring to FIG. 1, an exemplary embodiment of the tool of this invention includes an auger comprising a helical cutting blade 10 attached to an elongated shaft 12. The main part of the helical auger blade 10 is 2½" in diameter. This size allows most pre-started plants to be dropped in the hole and still gives enough room for filling looser soil next to the plant where the roots will take hold.

Easy stand-up operation is provided by making the shaft 12 approximately 24" long, making the shroud 14 clear so it is easy to see what is happening and whether debris is in the catch ring. Also, the depth measurement rings 16*a*, 16*b* and 16*c* on the shaft 12 are easily visible while the tool is being operated. The hole depth is determined when the ring representing the selected depth is even with a flange 18 on the top of the shroud.

Centering the auger is accomplished with a short, round, pointed tip 20 so that it is easy to locate the planting hole. It is simply worked past any debris and lightly stuck into the ground about ¼". The drill motor is positioned vertically, started at a moderate speed, and then light downward pressure is applied to start the drilling operation. The tip 20 is an extension of the shaft 12. The shaft 12 should be as close to ⅜" OD as is practical. If it is appreciably smaller it can be accidentally bent causing the auger to vibrate. This larger diameter also provides more surface area contact with the dirt to help keep it in place. This diameter is still small enough to fit in most drill motors. The tip should be short enough, about ¾" so that when it is turning at the bottom of a typical 2" deep annuals plant hole, it does not penetrate to where other types of perennial plant bulbs may be located. It should be long enough so that when the tool is positioned, the leading edge of the auger is above any ground cover. At least a 1" minimum safety margin should be left between the bottom of annuals' planting holes and the top of deeper perennial bulbs. This provides the needed buffer distance and offers the option of leaving perennial bulbs in an area where annuals will be planted.

Root cutting and pilot hole features facilitate starting new flowerbeds in hard ground. Root cutting is important since even in established beds, roots cause regular augers to grab frequently. This is the most frustrating parts of using conventional augers and makes them inefficient and difficult to use. Getting stuck also puts the drill motor in a "locked rotor" mode which can cause it to overheat. The root cutter helps eliminate this and a light "bouncing" action, especially in hard ground, helps it to quickly dig the hole while keeping the motor at a reasonable speed. The root cutter is a pair of simple, vertically oriented, triangular blades 22*a* and 22*b* near the outside edge of the leading edge of the auger blade 10. The vertical orientation of the blades 22*a* and 22*b* improves root cutting since most roots run horizontally. It provides a slicing action across the roots. The cutters are about 0.070" thick, ¼ high and slightly over 0.40" long. Each blade is tapered at the front and extends below the leading edge of the auger. This is backwards to a saw blade tooth. If the leading edge is vertical, it tends to grab instead of slice. A dual blade cutter can be easily implemented with a welded metal "T" at the start, and this reduces tool vibration even more. A plastic spiral ramp can be attached to this metal "T", and this combination is a cost-effective way to produce the auger.

Implementing a pilot hole feature in the cutter will taper or round the bottom of the hole to more exactly match the contour of the roots and soil on the pre-started annuals, as they come out of the plastic starters. This contour matching makes refilling even a little easier.

Figures 5, 6:
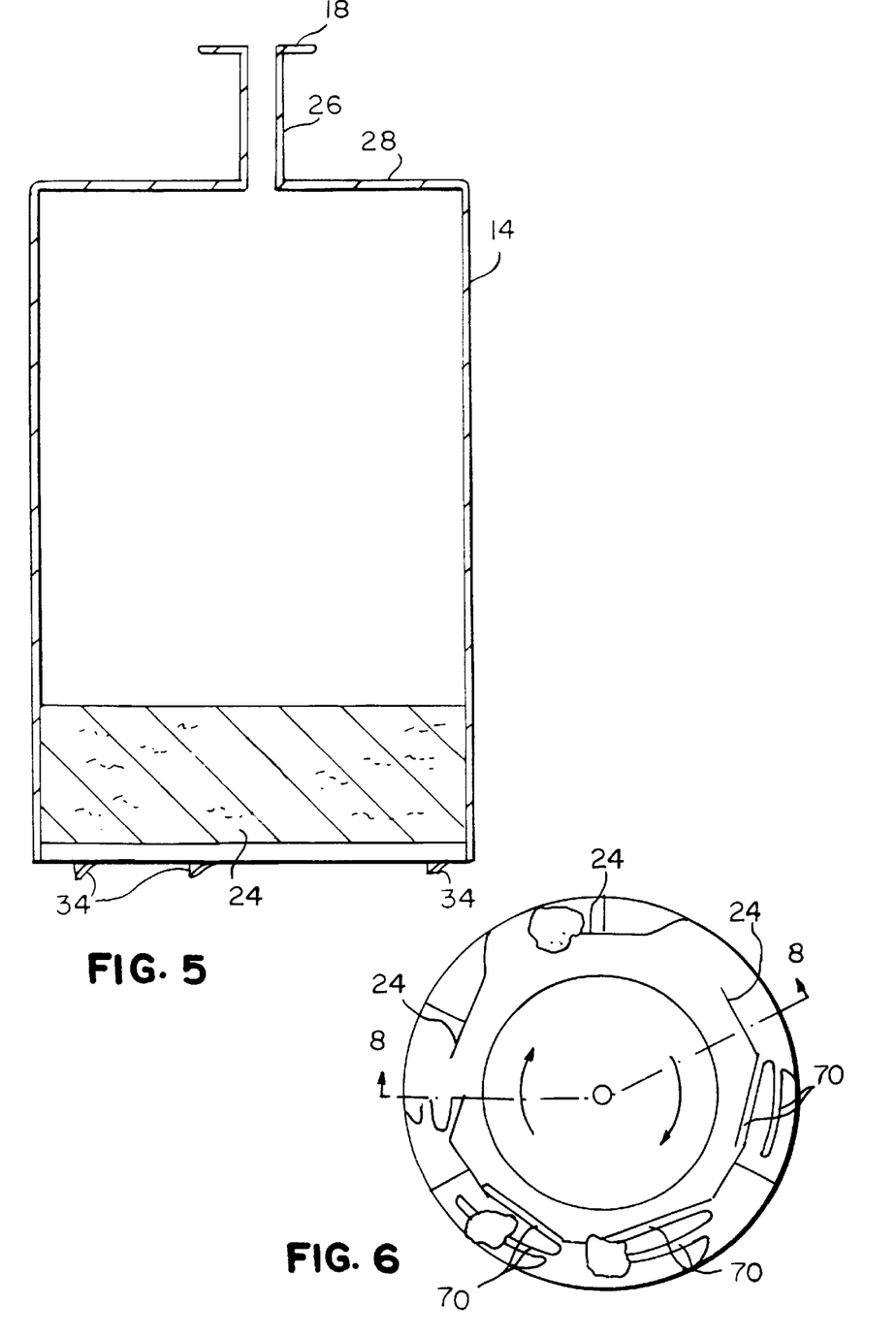
FIG. 5 is a vertical section of the shroud member in the planting tool of FIG. 1.
FIG. 6 is a horizontal section taken through the shroud member at two different elevations, and illustrating the movement of a rock within the interior of the shroud.

The protective shroud 14 is made from clear, high impact injection molded plastic. This allows the numerous mechanical features providing the performance advantages, to be economically fabricated. The shroud 14 is produced with a wall thickness of 0.080" and is 4.3" in diameter and 7.5" tall. Internal louvers 24 on the sides that allow the dirt to escape are configured with an overlap over the hole edges. This prevents dirt and debris from having a direct path through a gap so that it could "fly out". This also accurately places the dirt close to and around the hole perimeter. There are typically six louvered openings. The auger shaft 12 fits through a hole in the center of an upper portion 26 of the shroud so that the interior wall of the upper portion 26 acts as a bearing. The hole is 1½" long so that there is enough length to keep the shroud centered around the auger and this also prevents vibration. There is 0.010 of clearance between these parts so the shroud 14 can slide easily up and down the shaft 12, and the shaft can turn easily inside the bearing. The shroud 14 completely surrounds the excavating part of the auger so that it offers a protective barrier from the cutting and excavating parts. The top wall 28 of the main portion of the shroud 14 is flat so that it provides a friction plate with an internal, adjustable slip ring 30 on the shaft 12.

Just prior to starting the hole excavation, the tip 20 is located, the drill motor is started, and the shroud 14 starts spinning. Since this spinning force is delivered through only the shroud weight and friction between the two parts, the forces are adequate to remove ground cover but not strong enough to hurt someone. If more force is needed to remove the ground cover, then the drill is simply run slightly faster, and the increased momentum does the job. Also the part that spins does not have clearing features that stick out past the edge. They point down. This is an addition element of protection since there is nothing protruding "out" to come in contact with the operator. To reduce tooling cost, the shroud can be produced in two pieces with latches so that it snaps together. The first piece forms the cylindrical sides with the openings for dirt removal and the rock catcher. The second piece forms the top with its bearing that the shaft goes through.

Mulch and groundcover removal are accomplished in two progressive stages and a third can be easily incorporated if needed. This is a very important feature. To reiterate, with prior technology this material fell into the hole and/or was worked into or mixed with the soil. This progressively made the planting more difficult. This also made it difficult to obtain uniform, well formed holes, and plant roots do not grow in rocks or wood. The present invention prevents the problem from occurring by automatically removing the debris or ground cover from around the hole before it is formed. This includes the area where the pulverized dirt will be placed by the tool. In addition, it also "automatically" removes some larger debris from the hole or soil, if this material is already in the soil. This will be explained in a later section.

The first ground cover removal means is accomplished through the spinning motion of the leading edge of the auger blade 10. It hits the debris on the surface and knocks it out of the way while taking additional debris that is farther out along with it. With prior-art techniques this could throw material a foot away, and the excavated dirt followed right along. With the present invention, this effect is controlled and optimized. The planter shroud contacts an adjustable disc on the auger shaft, which allows one to slide the shroud 14 up or down to adjust the shroud height in relation to the auger tip 20. In a typical setup there is a small depth difference or gap, usually under ½", between the auger tip and the bottom of the shroud. A set of three rings 32*a*, 32*b* and 32*c* are painted on the shaft, at ½" increments, for adjusting the slip-ring/shroud gap distance. The first is right at ground level, the second is at a +e,fra 1/2+ee" gap and the third is a 1" gap. The slip ring 30 can of course be set at any point between these marker rings.

As the leading edge of the auger first starts to contact the dirt, centrifugal force throws the ground cover away from the hole in the same manner as conventional augers, except the tip 20 prevents the auger from wandering across the surface of the soil. With this tool, however, loose material can only escape under the shroud lip in the gap determined by the slip ring position. The shroud 14 is kept close enough to the ground so that the debris is only removed a few inches and is not a hazard. After the ground cover has been removed from the auger area and the auger has penetrated down the tip's ¾" length, the spinning shroud now starts to contact the surface. The auger shaft slides through the bearing as it goes deeper. This first operation can be bypassed by positioning the sliding disk lower on the shaft so that the shroud contacts the ground before the leading edge of the auger. In this setup nothing flies out under the shroud when the hole is started, but ground debris is not removed as thoroughly. If the disc is set higher or the drill is run faster, larger debris can be removed.

The second ground cover clearing feature is the shroud 14 itself. This operation is carried out after the auger has done its initial work. When the tip 20 is placed in the ground and the drill motor is started, friction between the slip ring and the shroud causes the shroud to start spinning at the motor speed. As the tool is slowly pushed into the ground, the leading edge of the auger removes ground cover over the area where the hole will be. As it goes deeper, the gap is eliminated and the bottom of the shroud starts to contact the ground cover. The spinning shroud then removes additional ground cover but at the larger radius where the auger's effectiveness is diminished. This includes the outer perimeter where pulverized dirt is deposited during the next phase of the operation. Ridges or teeth 34 contoured into the bottom of the shroud enhance the effect. These ridges also stop the shroud from spinning after the loose cover is removed and they start to make contact with solid ground. The sliding disc can be designed so that one side has more friction than the other. This permits selection of the amount of power delivered for cleaning, depending on which side is up. This can be done by having different drag coefficients or surface areas on the two sides.

A third operation is accomplished by installing a line or flexible blade at the tip of the auger. This can be done by providing two or more holes in the shaft tip or near the leading edge of the auger. A representative implementation is a flattened area on the auger shaft with two small holes in it. These are just before the start of the auger screw. A nylon cord is fed through one hole and out the other so that the tight bend between the holes holds it in place. The nylon cord then acts as a weed whip for clearing.

Pulverizing the dirt is enhanced with a further optional feature. Since the excavated dirt is initially contained by the shroud, while the auger is still turning at a high RPM, the dirt is tumbled against itself, the auger and the shroud. This "tumbling" helps to break and grind the dirt into smaller and more uniform pieces. An additional outward slope built into the helical auger blade or ramp (see FIG. 2), that lifts the dirt out of the hole, also forces the dirt to the outside edge and this concentrates it in this tumbling area. The front cutting edges on the auger and root cutters do the initial break up, and this tumbling finishes pulverizing the dirt. The metal "T" piece welded to the shaft 12 and injected molded plastic blade or ramp 10 attached to it have already been described. The real cutting forces are then on the metal and all the plastic does is basically lift the dirt out of the hole and tumble it. Breaking the dirt up even more can be enhanced by adding features such as stamped teeth or ridges on the leading edge of the screw. The preferred embodiment is the welded "T", possibly with a folded flap root cutter on the leading edge.

Dirt placement around the hole is accomplished by having slots 40 (see FIG. 7) in the shroud 14 so that dirt coming out of the hole is piled in a controlled way right next to the edge of the hole. Typically there are six slots 40 around the perimeter of the shroud 14. They are about ¼" from the bottom. They are 1½" high and 1¼" wide. Each has an internal flap or louver 24 that deflects dirt and debris so that centrifugal force does not discharge it directly through these openings. These louvers 24 are attached on one side of the opening. They are curved to the other side which has a ½" gap. This produces an internal scoop. The auger turns in the conventional "clockwise" direction. The dirt inside the shroud 14 will also start turning in this direction. The internal louvered scoops direct the pulverized dirt as it is rotating inside the shroud, so it exits through the slots 40. The dirt then accumulates just outside the shroud 14. Some will stay inside the shroud. When the hole is finished, the drill is stopped. The shroud is lifted straight up. Since it is thin and there are no protrusions, lifting it does not disturb the piled dirt. It is left in place ready to refill the hole.

Figure 7:
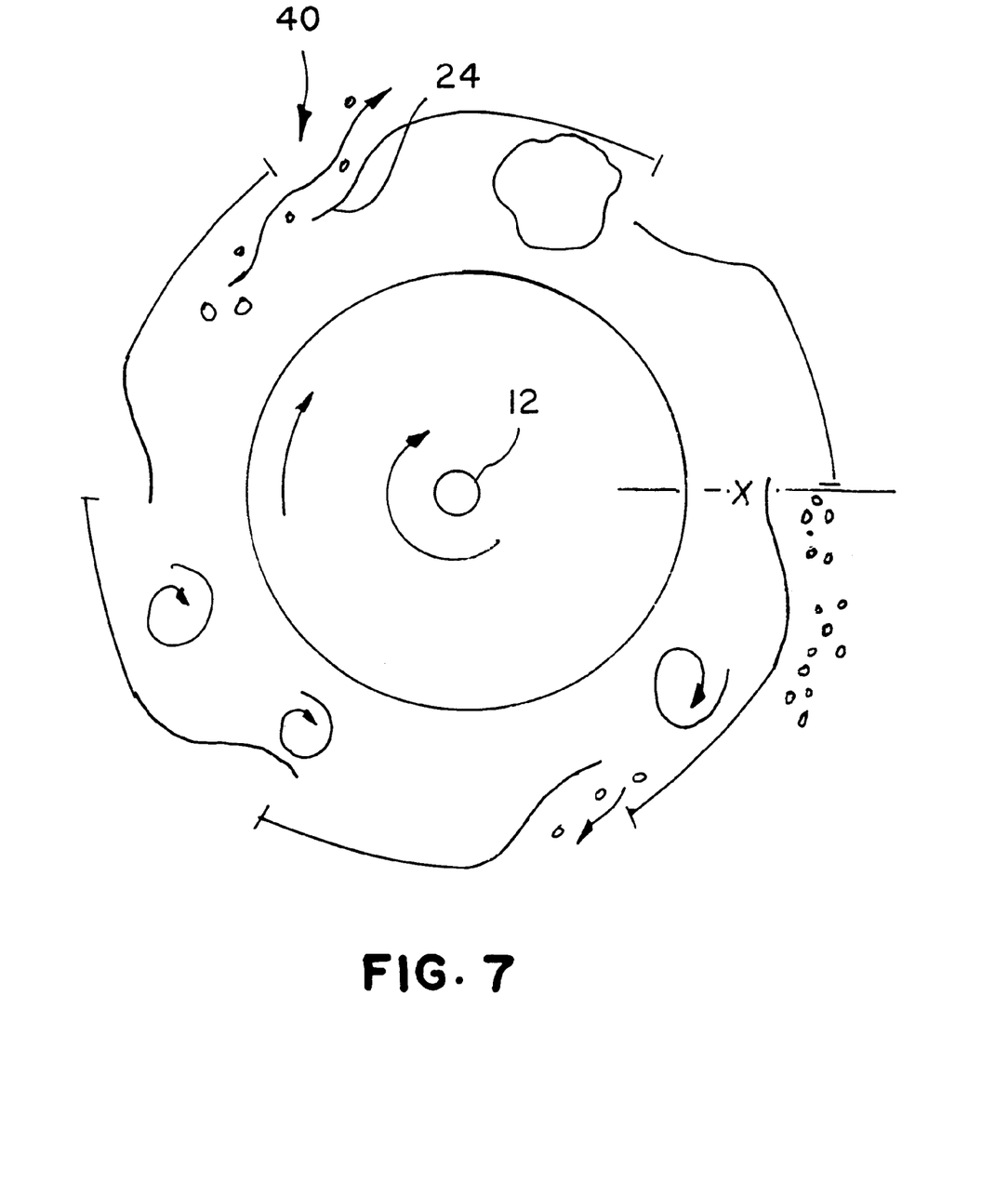
FIG. 7 is a horizontal section taken through the shroud member and illustrating the movement of dirt within the interior of the shroud.

Since this technology is intended to provide a method for producing both deep and shallow planting holes, the ports 40 are important to allow an exit route for the extra dirt that is produced when deeper holes are made. If they were not present, the shroud 14 would fill up when 6" deep holes were wanted. The shroud 14 can be made larger in diameter, but then it is just bulkier, and the ground-clearing feature does not work as well. You also do not get a good look at the condition of the dirt.

It is not desirable to have the shroud 14 turning while the auger blade 10 is excavating the dirt. This is because the turning and vibration can knock dirt back into the hole or cause the piled dirt to sift out further from the hole. The teeth 34 on the bottom, which initially were spinning with the shroud to remove groundcover, perform a second function. After the shroud comes in contact with the solid ground, as the auger starts digging, the teeth 34 dig in and stop the shroud from turning. This improves the dirt piling.

Figures 2, 3, 4:
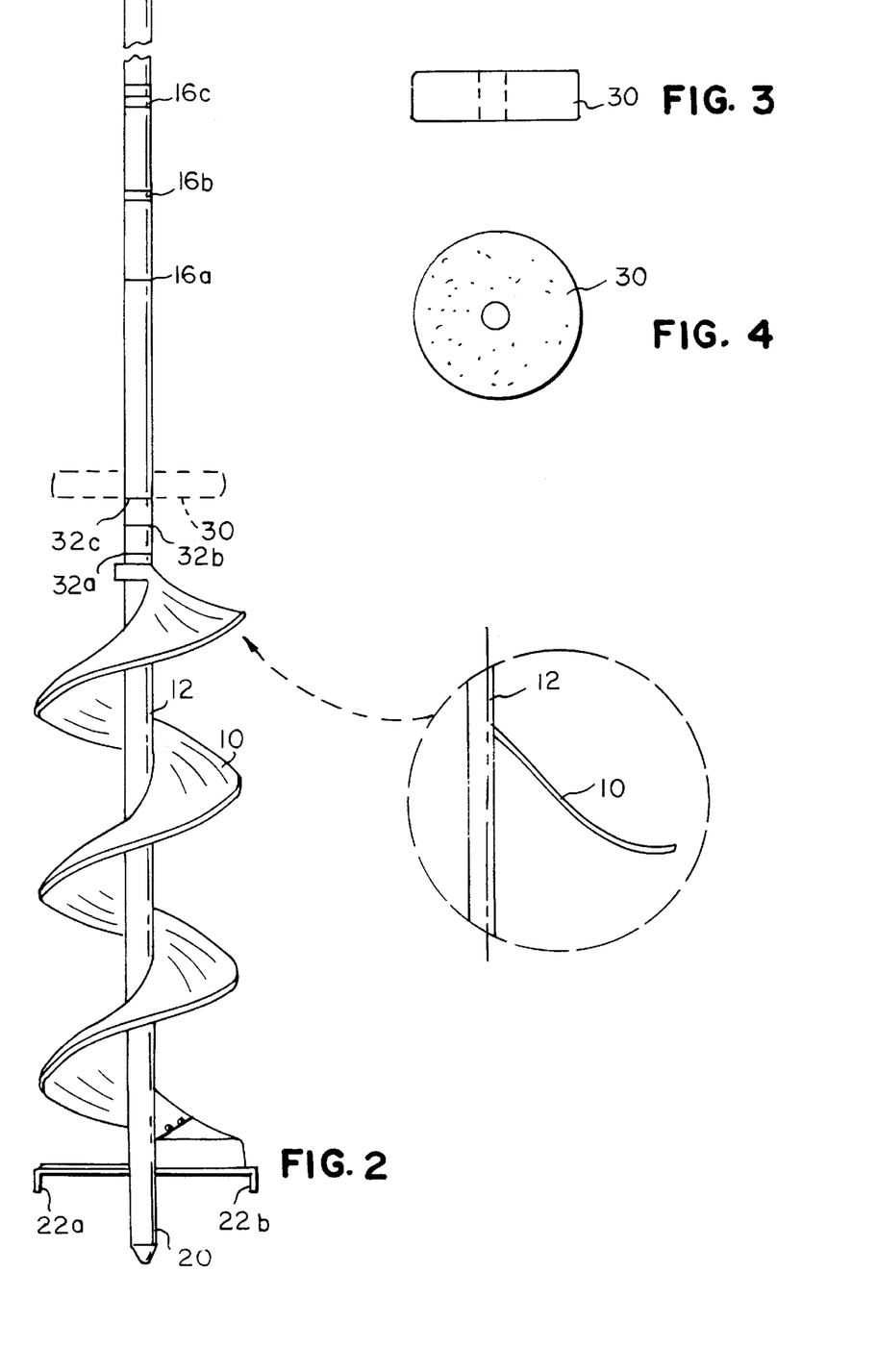
FIG. 2 is a side elevation of the auger member in the planting tool of FIG. 1, including both the helical cutting element and its central shaft.
FIG. 3 is a side elevation of the slip ring in the planting tool of FIG. 1.
FIG. 4 is a top plan view of the slip ring shown in FIG. 3.

To assure that the dirt is moved out of the shroud and piled around the outside, the spiral ramp has a 45° taper from the inside to the outside (see FIG. 2). This positively moves the dirt to the outside and helps push it out through the slots 40. This same taper helps the tumbling action that pulverizes the dirt.

An alternate embodiment can be made with four pieces, as shown in FIGS. 9–12. In this alternate embodiment, the auger has a conventional spiral metal ramp 50 which reduces tooling cost. It has notches 52 and 54 on the outside edge of the spiral to lock the additional fourth piece, which is an unloader/pulverizer flap 56. The flap 56 is positioned according to the depth of the hole so that it pushes the dirt out of the hole. This replaces the 45° taper. In use this flap 56 is simply hand-positioned by spiraling it up or down the auger and then locking it into one of the notches, which are at 1" depth increments, with latches 58 and 60. In a further alternate embodiment, or as an optional part, this forth piece can also be designed to produce a larger diameter hole with the smaller diameter slotted auger. In this design the flap has a larger diameter flare at the top that "reams" out additional dirt at the top of the hole.

Figure 8:
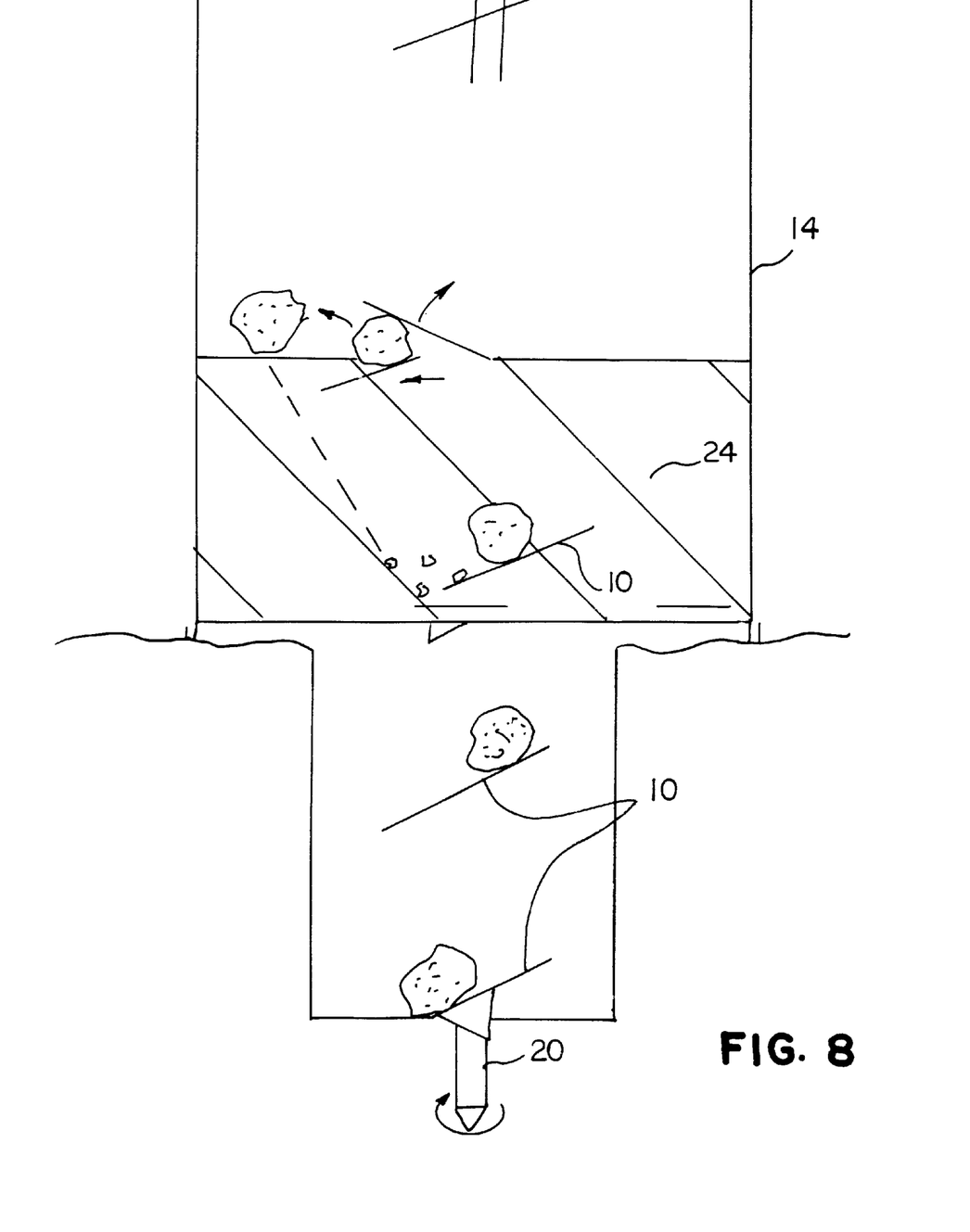
FIG. 8 is a diagrammatic illustration of portions of the auger and the interior of the shroud, illustrating the movement of a rock along the auger and within the interior of the shroud.
Figures 9, 10, 11, 12:
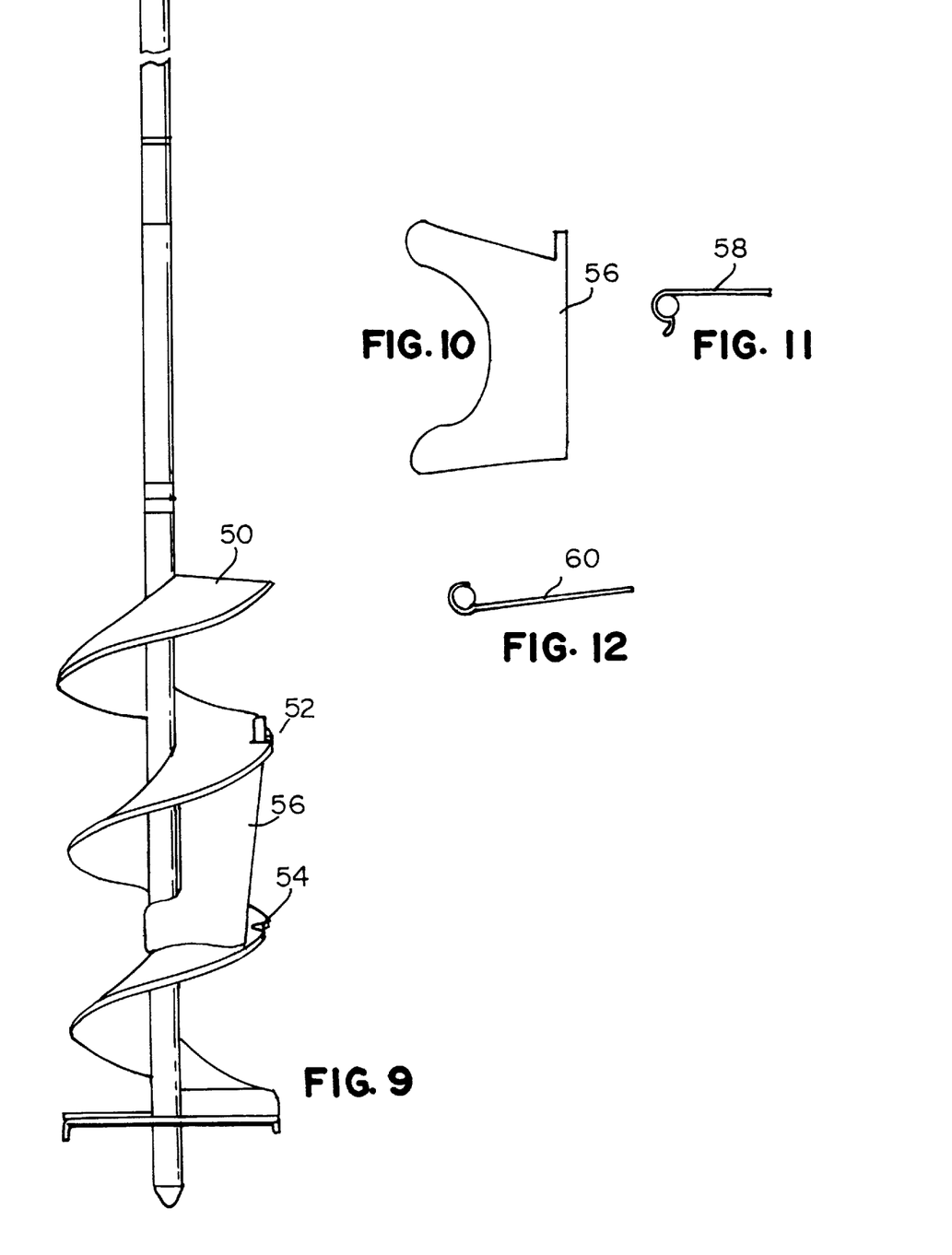
FIG. 9 is a side elevation of a modified auger that includes an unloading flap.
FIG. 10 is a side elevation of the unloading flap included in the modified auger of FIG. 9, prior to installation of the flap into the auger.
FIG. 11 is a plan view of the upper fastening device for the unloading flap in the modified auger of FIG. 9.
FIG. 12 is a plan view of the lower fastening device for the unloading flap in the modified auger of FIG. 9.

Large rock or debris sifting and the catch ring for this material is implemented with some simple features built into the shroud 14. The internal louvers 24 are set at an angle. As the auger turns, larger rocks are lifted out of the hole by the spiral ramp 10. When they get to the top of the hole, they then come in contact with the tapered leading edges of the dirt-piling louvers 24. Since the rocks are larger than the holes that the pulverized dirt unloads through, they are in effect sifted out and continue up the ramped face of the louvers with the auger's rotation propelling them. At the top, fingers 70 are molded into the shroud 14, and the rocks lift the free end and continue up till they are above the louvers 24. The resiliency of the fingers 70 moves them back down. They then form a catch ring where the rocks and debris come to rest. Emptying the catch ring is simply a matter of sliding the auger down enough so that the 2½" ramp part is below the mouth of the shroud 14. Tilting the tool and shaking it drops the rocks out.

The auger shaft also has the coded circular rings 16 at 1" increments so it is easy to determine the depth by referencing these to the top of the shroud 14 when it is resting on the ground and the hole is being formed. In example, if one wants 2" deep holes, the hole is drilled until the two circular lines on the shaft 12 are at the top of the shroud 14. For 3", the 3-line mark is used, etc. The reference ring in the set is slightly wider than the count rings. An optional locking slip ring can provide an easy way to assure correct depth by providing a mechanical stop at the selected hole depth. When the stop comes into contact with the shroud, the drill cannot go any deeper.

What is claimed is:

1. A planting system for drilling planting holes in the earth using a portable electric drill having a chuck for receiving tools to be rotatably driven, said planting system comprising an auger having a helical cutting blade and a shank adapted for insertion into the chuck of the electric drill, root-cutting means at the lower end of the auger, a cylindrical shroud slidably mounted on the shank of the auger and extending downwardly around the auger with the inside wall of the shroud spaced away from the outer edge of the helical cutting blade of the auger, a slip ring mounted on said shank below the inside surface of a top wall of said shroud for engaging and rotating said shroud with said shank until said shroud is displaced upwardly along said shank by engagement with the earth, and a pointed centering tip extending downwardly from the lower end of the auger along the longitudinal axis of the auger.

2. The planting system of claim 1 which includes catch means attached to the shroud and extending radially inwardly from the inside surface of the shroud toward the outer edge of the helical cutting blade of the auger.

3. The planting system of claim 1 which includes depth measurement rings on the shank of the auger above the shroud to measure the movement of the auger as the auger penetrates into the soil.

4. The planting system of claim 1 which includes exit holes in said shroud and soil-controlling louvers associated with said holes on the inside wall of the shroud, said louvers being configured to move extracted soil outwardly through said holes.

* * * * *